(12) United States Patent
Asakura et al.

(10) Patent No.: US 12,233,766 B2
(45) Date of Patent: Feb. 25, 2025

(54) CONNECTION BAR MOUNTING STRUCTURE AND VEHICLE SEAT

(71) Applicants: Adient Engineering and IP GmbH, Burscheid (DE); Subaru Corporation, Tokyo (JP); Toyota Jidosha Kabushiki Kaisha, Toyota (JP)

(72) Inventors: Takayuki Asakura, Tokyo (JP); Akihide Onodera, Tokyo (JP); Satoshi Obara, Tokyo (JP); Hiroshi Eguchi, Yokohama (JP); Hiroyuki Yasui, Yokohama (JP); Nilesh Firke, Maharashtra (IN); Ajeet Tasagave, Maharashtra (IN); Abhinav Chaubey, Maharashtra (IN)

(73) Assignees: Adient US LLC, Plymouth, MI (US); Subaru Corporation, Tokyo (JP); Toyota Jidosha Kabushiki Kaisha, Aichi (JP)

(*) Notice: Subject to any disclaimer, the term of this patent is extended or adjusted under 35 U.S.C. 154(b) by 336 days.

(21) Appl. No.: 17/660,082

(22) Filed: Apr. 21, 2022

(65) Prior Publication Data
US 2022/0340056 A1    Oct. 27, 2022

(30) Foreign Application Priority Data
Apr. 27, 2021    (IN) .............................. 202141019295

(51) Int. Cl.
*B60N 2/50* (2006.01)
*B60N 2/68* (2006.01)

(52) U.S. Cl.
CPC ............. *B60N 2/507* (2013.01); *B60N 2/682* (2013.01)

(58) Field of Classification Search
CPC ...... B60N 2/507; B60N 2/682; B60N 2/1615; B60N 2/161; B60N 2/045; B60N 2/42;
(Continued)

(56) References Cited

U.S. PATENT DOCUMENTS

| 2,931,519 A * | 4/1960 | Beach ....................... B64F 5/50 254/9 R |
| 6,220,669 B1 * | 4/2001 | Frohnhaus ........... B60N 2/1615 297/440.14 |

(Continued)

FOREIGN PATENT DOCUMENTS

| CN | 103562004 A | 2/2014 |
| CN | 203805732 U | 9/2014 |

(Continued)

OTHER PUBLICATIONS

Matsuyama (JP 2013099975 A), machine translation, May 23, 2013 (Year: 2013).*

(Continued)

*Primary Examiner* — Amy R Weisberg
*Assistant Examiner* — Wenwei Zhuo
(74) *Attorney, Agent, or Firm* — Marshall & Melhorn, LLC (57) ABSTRACT

A connection bar mounting structure includes: link members, each including a first hole part in a middle part; vehicle members, each configured to rotatably support each link member at a first fixation part of each link member; side frames, each configured to rotatably support each link member at a second fixation part of each link member opposite to the first fixation part across the first hole part; and a connection bar, each end thereof fixed to the first hole part of each link member. Each link member has a first bending rigidity reduced section between the middle part and the first fixation part and a second bending rigidity reduced section (Continued)

between the middle part and the second fixation part, the first and second bending rigidity reduced sections having bending rigidity smaller than those of the middle part, the first fixation part, and the second fixation part.

5 Claims, 6 Drawing Sheets

(58) Field of Classification Search
CPC .. B60N 2/4207; B60N 2/4235; B60N 2/4214; B60N 2/42709; B60N 2/42754; B60N 2/42727; B60N 2/42736
USPC ..... 296/65.01, 68.1, 65.02; 297/216.1, 216.2
See application file for complete search history.

(56) References Cited

U.S. PATENT DOCUMENTS

| | | | | |
|---|---|---|---|---|
| 7,959,229 B2* | 6/2011 | Ishijima | ................ | B60N 2/165 |
| | | | | 297/358 |
| 8,684,462 B2* | 4/2014 | Brewer | ................... | B60N 2/06 |
| | | | | 297/344.17 |
| 8,833,849 B2* | 9/2014 | Ishimoto | ................. | B60N 2/68 |
| | | | | 297/216.13 |
| 9,597,989 B2 | 3/2017 | Hattori et al. | | |
| 9,682,643 B2* | 6/2017 | Wegenka | ........... | B64D 11/0646 |
| 2007/0158988 A1* | 7/2007 | Yoshida | .............. | B60N 2/1615 |
| | | | | 297/344.14 |
| 2011/0278892 A1 | 11/2011 | Kroener et al. | | |
| 2012/0212014 A1* | 8/2012 | Arata | .................. | B60N 2/1615 |
| | | | | 297/216.1 |
| 2012/0212015 A1* | 8/2012 | Ozawa | ................ | B60N 2/1615 |
| | | | | 297/216.1 |
| 2013/0278030 A1* | 10/2013 | Munemura | .......... | B60N 2/1615 |
| | | | | 297/311 |
| 2014/0183918 A1 | 7/2014 | Kaku et al. | | |
| 2015/0091358 A1 | 4/2015 | Hattori et al. | | |
| 2015/0246624 A1* | 9/2015 | Furuta | ................ | B29C 66/7212 |
| | | | | 297/452.1 |
| 2020/0298741 A1* | 9/2020 | Demirci | ............... | B60N 2/3011 |

FOREIGN PATENT DOCUMENTS

| | | | | | |
|---|---|---|---|---|---|
| CN | 104619552 A | | 5/2015 | | |
| CN | 117246203 A | * | 12/2023 | ......... | B60N 2/42718 |
| JP | 2003276489 A | * | 9/2003 | | |
| JP | 2008260324 A | * | 10/2008 | | |
| JP | 2013099973 A | * | 5/2013 | | |
| JP | 2013099975 A | * | 5/2013 | | |
| JP | 2014136439 A | | 7/2014 | | |
| JP | 2016101845 A | | 6/2016 | | |
| JP | 2017007666 A | | 1/2017 | | |
| JP | 6434789 B2 | | 12/2018 | | |
| JP | 2019137230 A | | 8/2019 | | |
| WO | WO-2017118496 A1 | * | 7/2017 | ........... | B60N 2/1615 |

OTHER PUBLICATIONS

Intellectual Property India, Office Action in Application No. IN202141019295, dated Dec. 13, 2022, 6 pages.

China National Intellectual Property Administration, Office Action in Application No. CN202210435399.0, dated Jul. 31, 2023, 19 pages.

* cited by examiner

CONNECTION BAR MOUNTING STRUCTURE AND VEHICLE SEAT

BACKGROUND

1. Technical Field

The present disclosure relates to a mounting structure of a connection bar and a vehicle seat.

2. Description of the Background

Japanese Patent No. 6434789 (Patent Literature 1) discloses a vehicle seat with a lifter. The vehicle seat includes a pair of right and left cushion frames, a pair of right and left link members for connecting a front part of each of the pair of right and left cushion frames and a member on an upper rail side, and a connection bar called a front lift shaft for connecting the pair of right and left link members.

In this structure, the right and left link members are attached to the cushion frames by the connection bar to be rotatable with respect to the cushion frames via bearings.

The vehicle seat disclosed in Patent Literature 1 has a structure in which the connection bar extending in the left-right direction of the vehicle seat is integrally attached at connecting portions to the link members and the cushion frames extending in the orthogonal direction.

The structure has high resistance when an impact force mainly applied to the connection portions is in a direction orthogonal to the connection bar as in a head-on collision of a vehicle, and fracture in which the connection bar separates is unlikely to occur.

In contrast, the structure still has a room for improvement in resistance when a large bending moment or torsional moment is applied to the connection bar as in an oblique collision or an offset collision, and a structure in which the connection bar hardly separates in these collisions has been awaited.

SUMMARY

An object of the present disclosure is to provide a connection bar mounting structure in which the connection bar hardly separates and a vehicle seat.

A connection bar mounting structure according to a first aspect of the present disclosure includes a pair of link members, each link member including a first hole part in a middle part, a pair of vehicle members, each vehicle member configured to rotatably support each of the pair of link members at a first fixation part on a first end of each of the link members, a pair of side frames, each side frame configured to rotatably support each of the pair of link members at a second fixation part on a second end of each of the link members opposite to the first fixation part on the first end across the first hole part, and a connection bar, each end of the connection bar fixed to the first hole part of each of the pair of link members.

Each of the pair of link members includes a first bending rigidity reduced section between the middle part and the first fixation part and a second bending rigidity reduced section between the middle part and the second fixation part, the first and second bending rigidity reduced sections having bending rigidity smaller than those of the middle part, the first fixation part, and the second fixation part.

A vehicle seat according to a second aspect of the present disclosure includes a seat cushion frame attachable to a floor of a vehicle, the seat cushion frame configured to be raised and lowered relative to the floor.

The seat cushion frame includes a pair of side frames spaced apart in a width direction of the vehicle seat, a pair of link members, each link member including a first hole part in a middle part, each link member including a first fixation part on a first end, the first fixation part rotatably supported by each of the pair of side frames, and a second fixation part on a second end opposite to the first fixation part across the first hole part, the second fixation part rotatably supported by a vehicle member, and a connection bar, each end of the connection bar fixed to the first hole part of each of the pair of link members. Each of the pair of link members includes a first bending rigidity reduced section between the middle part and the first fixation part and a second bending rigidity reduced section between the middle part and the second fixation part, the first and second bending rigidity reduced sections having bending rigidity smaller than those of the middle part, the first fixation part, and the second fixation part.

DESCRIPTION OF EMBODIMENTS

A vehicle seat according to an embodiment of the present disclosure is described with reference to a seat 91 as an example.

Figure 1:
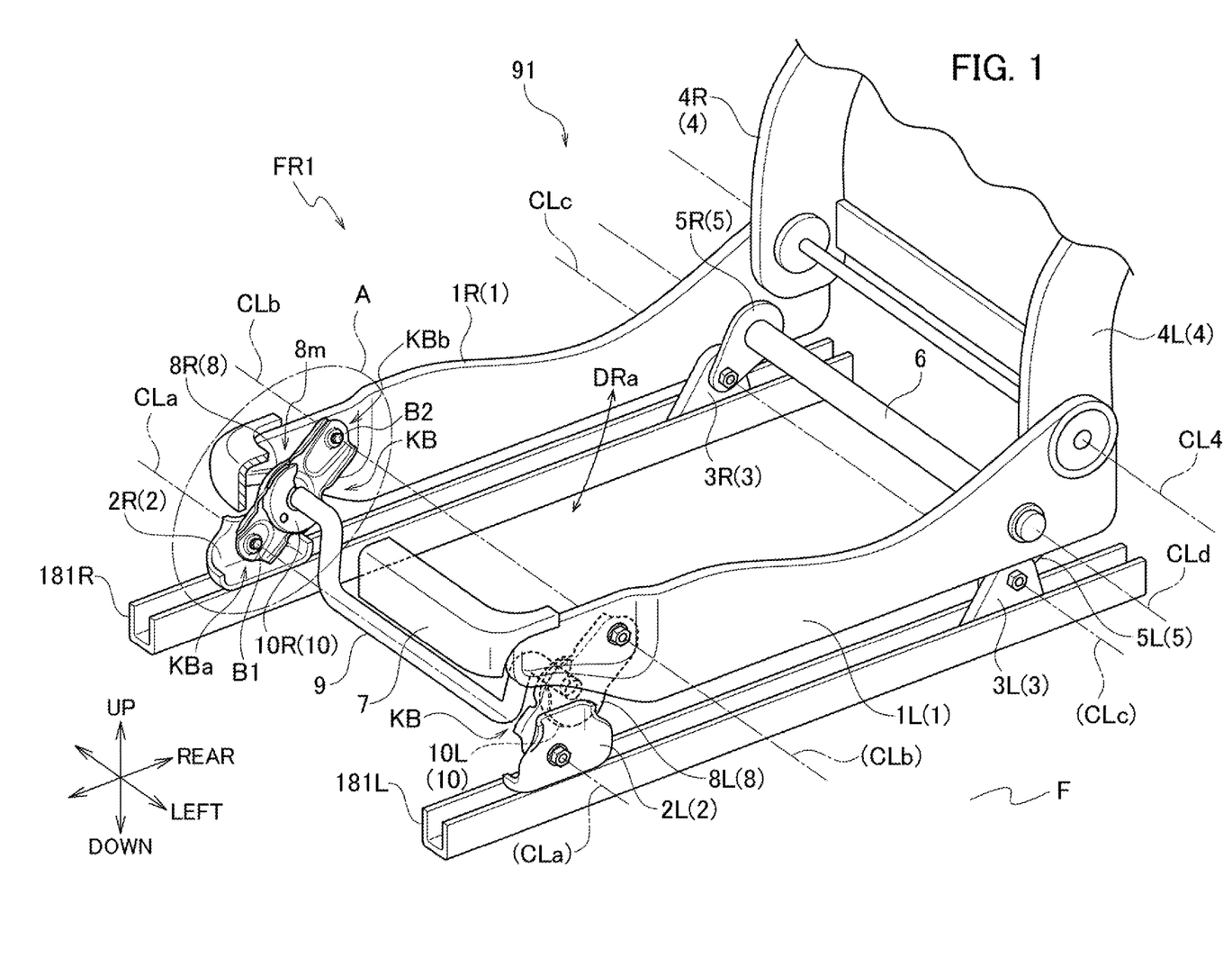
FIG. 1 is a perspective view of a frame structure of a seat 91 that is an example of a vehicle seat according to an embodiment of the present disclosure.

FIG. 1 is a perspective view of the frame structure of the seat 91. In the following description, the front, rear, left, right, up, and down directions are defined by arrows in FIG. 1. These directions are based on directions of a vehicle with the seat 91 mounted on the vehicle as a vehicle seat. The left-right direction is the width direction of the seat 91.

As illustrated in FIG. 1, rails 181L, 181R extending back and forth and spaced apart in parallel in the left-right direction are arranged on a floor F of the vehicle.

A front slider 2L and a rear slider 3L that are vehicle members are engaged with the rail 181L to be movable back and forth, and a front slider 2R and a rear slider 3R that are vehicle members are engaged with the rail 181R to be movable back and forth.

As illustrated in FIG. 1, the seat 91 includes a seat cushion frame FR1 and a seat back frame 4. The seat cushion frame FR1 is connected to the front sliders 2L, 2R that are a front slider 2 and the rear sliders 3L; 3R that are a rear slider 3 to be movable back and forth on the rails 181L, 181R.

The seat back frame 4 includes seat back frames 4L, 4R spaced apart and opposed each other in the left-right direction. The seat back frame 4 is rotatable about a rotation axis CL4 extending in the left-right direction at a rear part of the seat cushion frame FR1 and can be locked at a position of a predetermined rotation angle.

The seat cushion frame FR1 includes side frames 1L, 1R, a rear link 5, a rear connection bar 6, a front frame 7, a front link 8, and a front connection bar 9.

The side frames 1L, 1R are frames extending back and forth and are spaced apart and opposed each other in the left-right direction.

The front frame 7 is arranged to extend in the left-right direction and connects front parts of the side frames 1L, 1R.

The front link 8 is a link member and includes a pair of left and right front links 8L, 8R. The front links 8L, 8R have first ends rotatably connected to front parts of the side frames 1L, 1R by bolts B2 about a rotation axis CLb extending in the left-right direction.

The front links 8L, 8R have second ends opposite to the first ends rotatably connected to the front sliders 2L, 2R by bolts B1 about a rotation axis CLa extending in the left-right direction.

The front links 8L, 8R have support cups 10L, 10R respectively attached thereto and are connected by a front connection bar 9 extending in the left-right direction.

More specifically, the front connection bar 9 has its left end and right end, which are the both ends, fixed non-rotatably to the front links 8L, 8R, respectively, at substantially the middle part between the first end and the second end of each of the front links 8L, 8R.

Thus, the front links 8L, 8R integrally rotate with the front connection bar 9 about the rotation axis CLa with respect to the front sliders 2L, 2R.

The rear link 5 is a link member and includes a pair of left and right rear links 5L, 5R. The rear links 5L, 5R have first ends rotatably connected to rear parts of the side frames 1L, 1R by a rear connection bar 6 about a rotation axis CLd extending in the left-right direction.

The rear links 5L, 5R have second ends opposite to the first ends rotatably connected to the rear sliders 3L, 3R about a rotation axis CLc extending in the left-right direction.

The seat cushion frame FR1 includes a lifter mechanism (not shown) for raising and lowering the seat 91.

The lifter mechanism performs locking and unlocking of raising and lowering operations of the seat 91 and adjusts the amount of rotation of the rear links 5L, 5R, which is the amount of lifting of the seat 91 in the unlocked state, by the operation of an occupant.

With the above-described configuration, the seat 91 is movable in the front-rear direction relative to the floor F and is movable up and down with rotation (see arrow DRa in FIG. 1) by the rotation of the front links 8L, 8R and the rear links 5L, 5R about the rotation axes CLa and CLc.

Next, a connection bar mounting structure KB for fixing the front links 8L, 8R and the front connection bar 9 is described. Right and left connection bar mounting structures KB are symmetrical. Thus, the connection bar mounting structure KB on the right, which is a part A, is described with reference to FIGS. 2 to 9.

Figure 2:
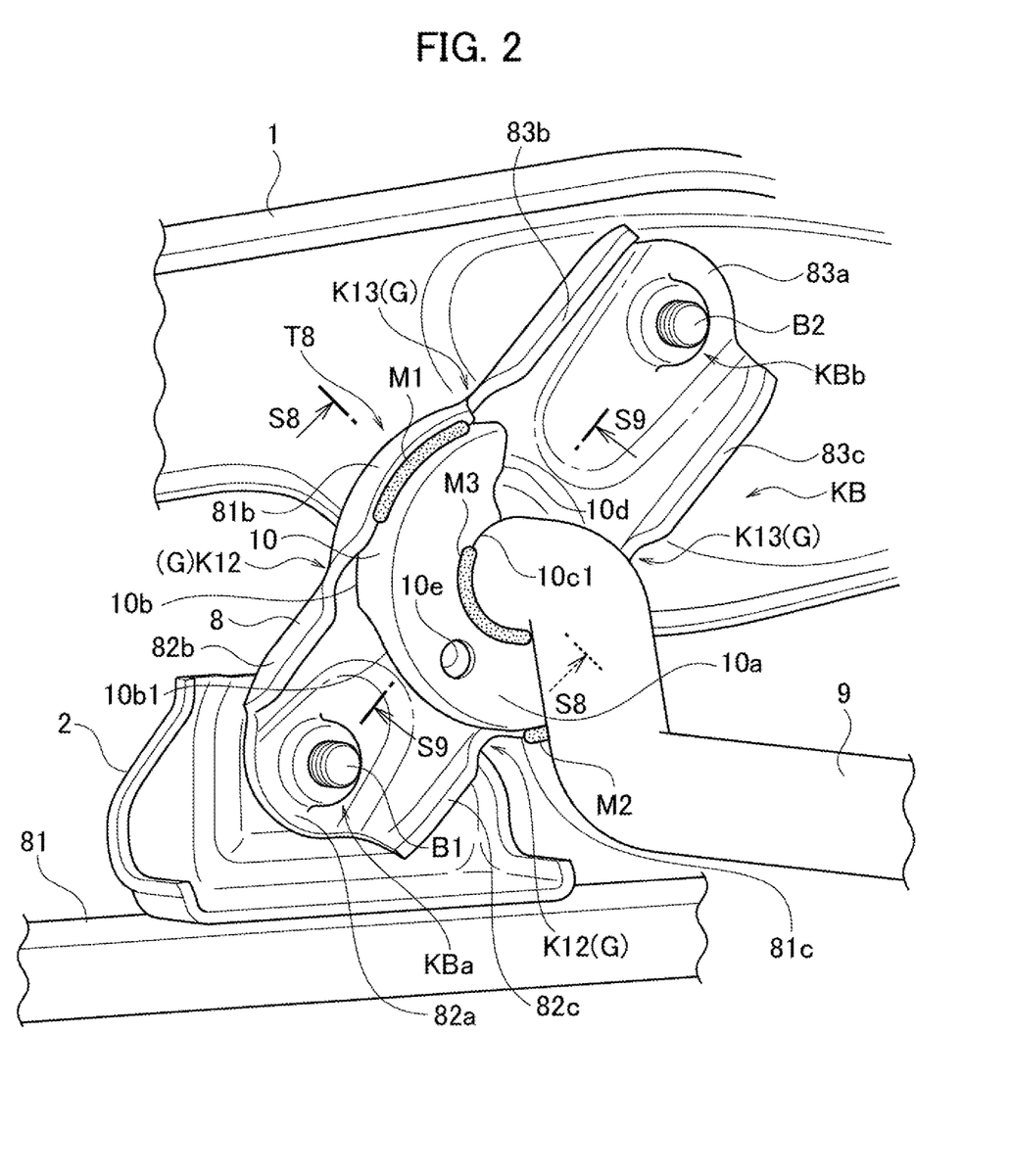
FIG. 2 is an enlarged perspective view of a connection bar mounting structure KB of FIG. 1.

FIG. 2 is an enlarged view of the part A in FIG. 1.

Figure 3:
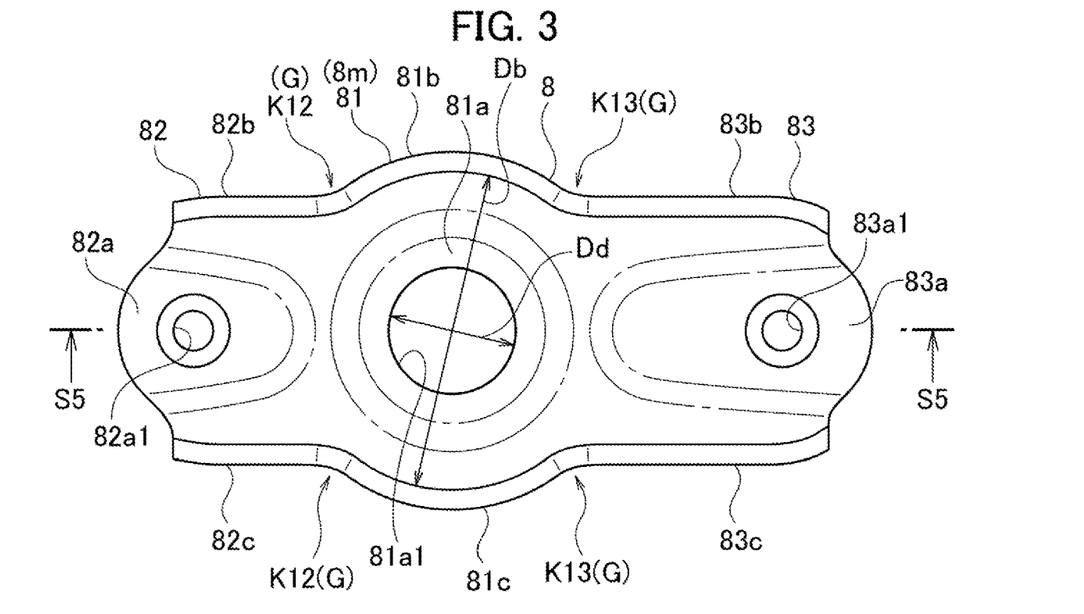
FIG. 3 is a plan view of a front link 8 included in the seat 91.
Figure 4:
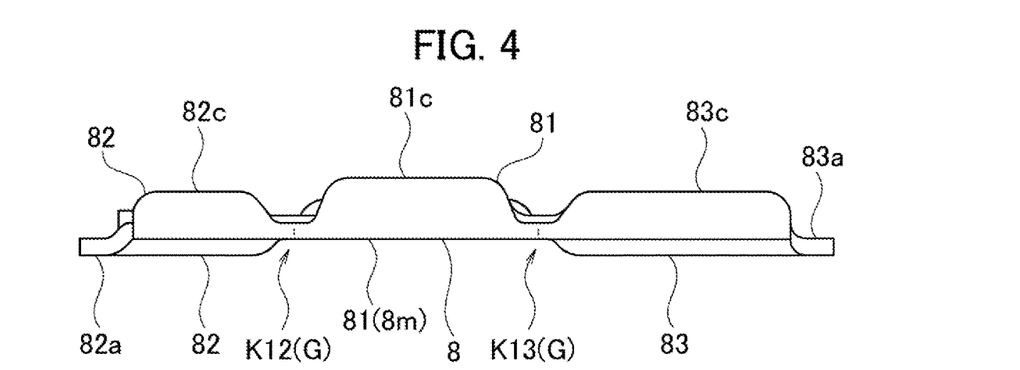
FIG. 4 is a side view of the front link 8.
Figure 5:
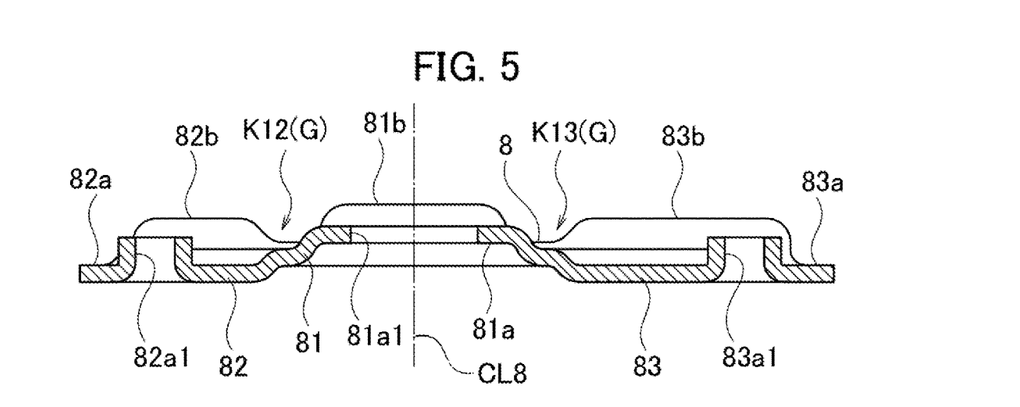
FIG. 5 is a sectional view taken along line S5-S5 in FIG. 3.

FIG. 3 is a plan view of the front link 8, FIG. 4 is a side view of the front link 8, and FIG. 5 is a sectional view taken along line S5-S5 in FIG. 3.

Figure 6:
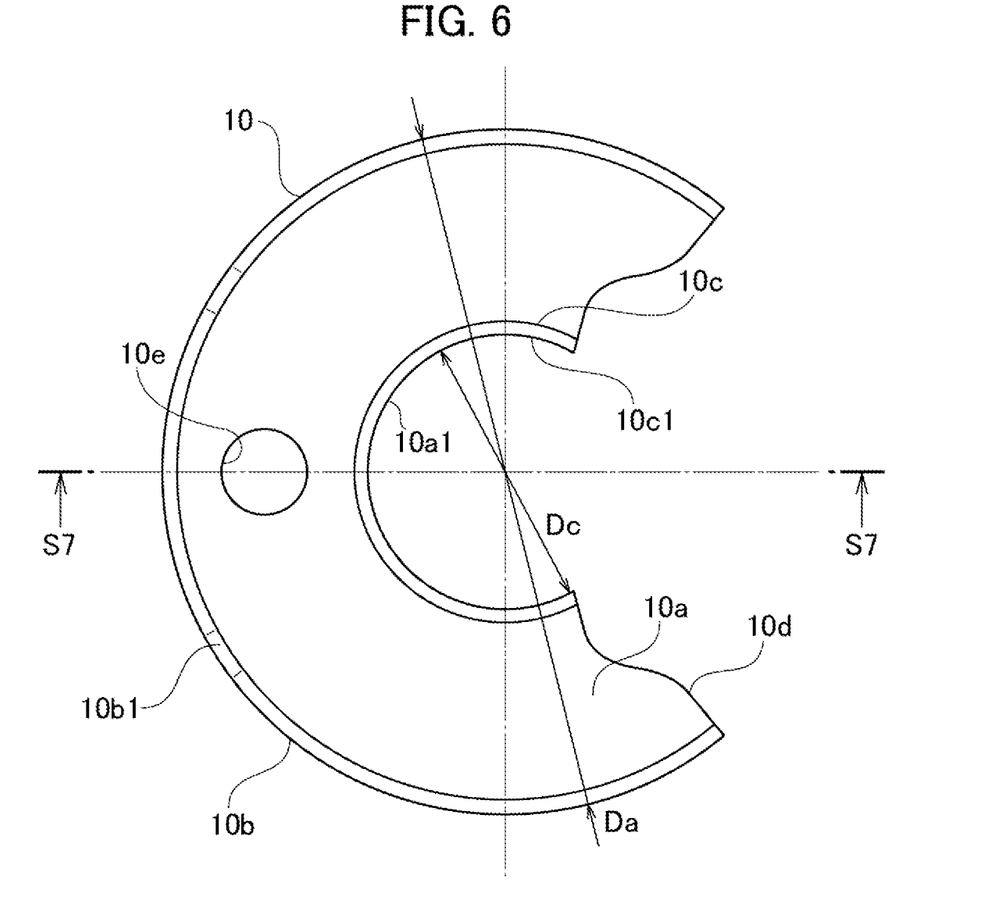
FIG. 6 is a plan view of a support cup 10.
Figure 7:
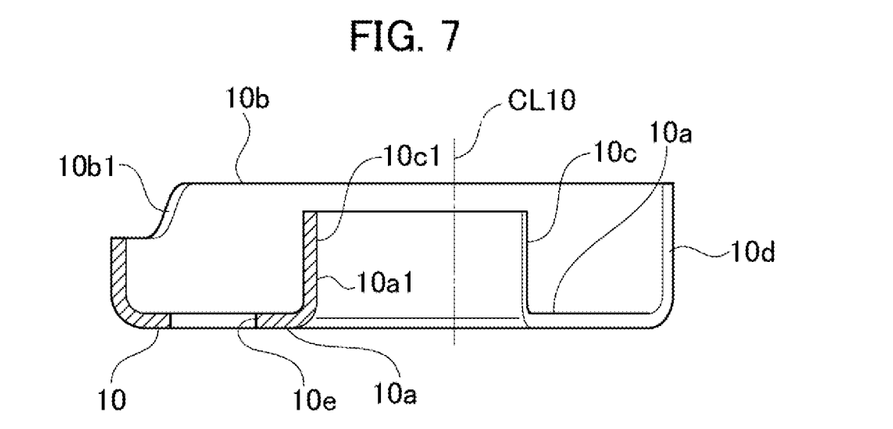
FIG. 7 is a sectional view taken along line S7-S7 in FIG. 6.

FIG. 6 is a plan view of a support cup 10, and FIG. 7 is a sectional view taken along line S7-S7 in FIG. 6.

Figure 8:
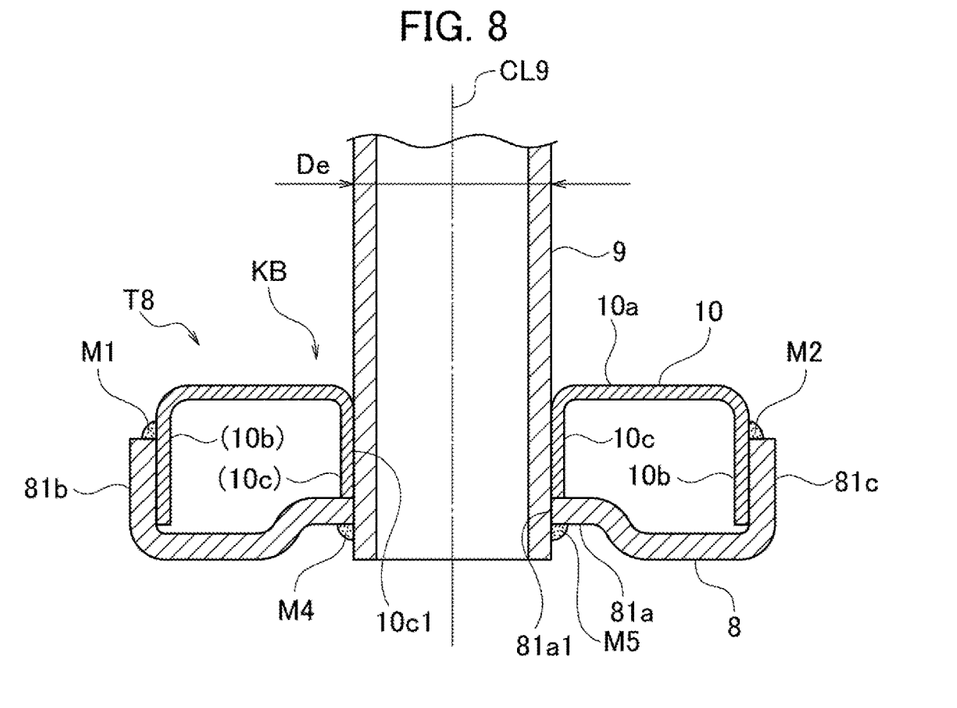
FIG. 8 is a sectional view taken along line S8-S8 in FIG. 2.
Figure 9:
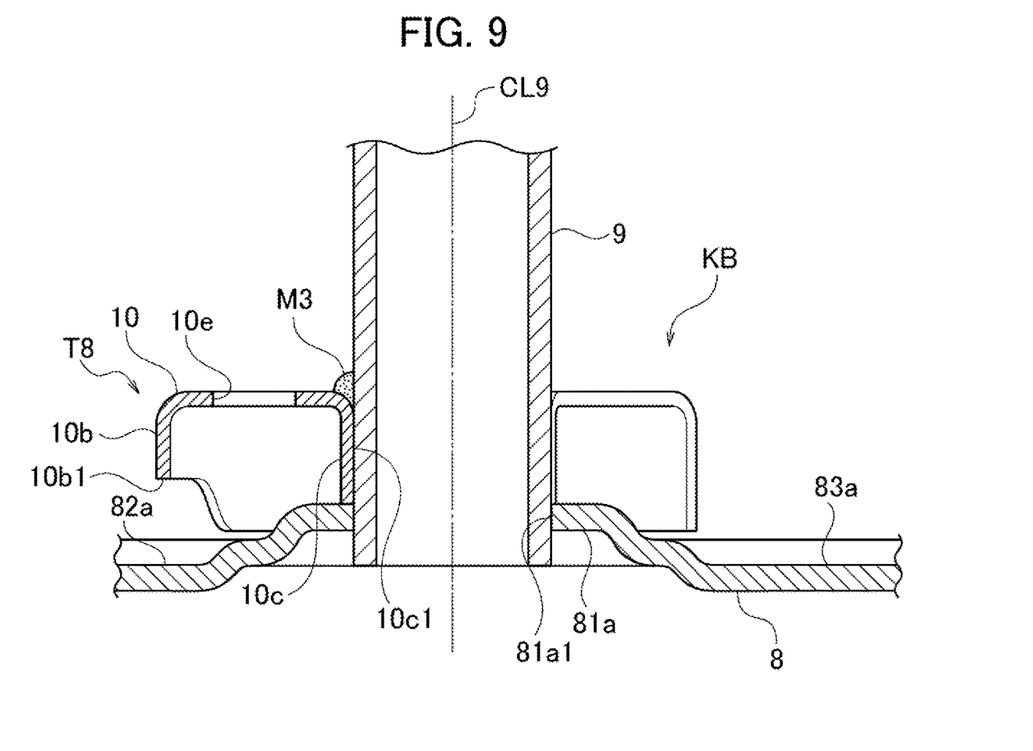
FIG. 9 is a sectional view taken along line S9-S9 in FIG. 2.

FIG. 8 is a sectional view taken along line S8-S8 in FIG. 2, and FIG. 9 is a sectional view taken along line S9-S9 in FIG. 2.

In the following description, the reference sign of each member is a reference sign excluding L and R without distinguishing right and left. For example, the front link 8R is the front link 8.

As illustrated in FIG. 2, the connection bar mounting structure KB includes the front link 8, the front connection bar 9, and the support cup 10.

First, the front link 8 is described in detail.

As illustrated in FIGS. 3 to 5, the front link 8 is a metal member including a base part 81 whose outer shape is partially arcuate, a first arm part 82 extending radially outward from a first end (left in FIG. 3) of the base part 81, and a second arm part 83 extending radially outward from a second end (right in FIG. 3) opposite to the first end. In this example, the second arm part 83 extends longer than the first arm part 82. The base part 81 is a middle part 8m of the front link 8.

The base part 81 includes a protruding part 81a protruding in a circular shape upward in FIGS. 4 and 5. In the center of the protruding part 81a, a through hole 81a1 in a circular shape having an inner diameter Dd is formed as a first hole part.

The base part 81 includes flange parts 81b, 81c bent to extend in the same direction as the protruding direction of the protruding part 81a at a pair of opposing peripheries that are arcuate parts.

The first arm part 82 includes a drawing part 82a protruding in a direction opposite to that of the protruding part 81a at the tip part, which is on the side of the first end. The drawing part 82a has a through hole 82a1 formed therein.

The front link 8 has a shaft portion of the bolt B1 inserted in the through hole 82a1 serving as a first fixation part KBa and is rotatably attached to the front slider 2 by a nut or the like (not shown).

The first arm part 82 includes flange parts 82b, 82c bent to extend in the same direction as the flange parts 81b, 81c at opposing edge parts except the tip part of the first arm part 82. The flange parts 82b, 82c are bent at substantially the same height as the flange parts 81b, 81c, respectively.

The second arm part 83 includes a drawing part 83a protruding in a direction opposite to that of the protruding part 81a at the distal end, which is on the side of the second end. The drawing part 83a has a through hole 83a1 formed therein serving as a second fixation part KBb.

The front link 8 has a shaft portion of the bolt B2 inserted in the through hole 83a1 and is rotatably attached to the side frame 1 by a nut or the like (not shown).

The second arm part 83 includes flange parts 83b, 83c bent to extend in the same direction as the flange parts 81b, 81c at opposing edge parts except the tip part of the second arm part 83. The flange parts 83b, 83c are bent at substantially the same height as the flange parts 81b, 81c, respectively.

The flange parts 81b, 81c and the flange parts 82b, 82c are not connected at the same height. Specifically, flange cutout parts K12, K12 having substantially no bent parts are formed between the flange parts 81b, 81c and the flange parts 82b, 82c.

Similarly, the flange parts 81b, 81c and the flange parts 83b, 83c are not connected at the same height. Specifically, flange cutout parts K13, K13 having substantially no bent parts are formed between the flange parts 81b, 81c and the flange parts 83b, 83c.

The bending rigidity of the flange cutout parts K12, K13 is smaller than those of a first section where the flange parts 81*b*, 81*c* are formed in the base part 81, a second section where the flange parts 82*b*, 82*c* are formed in the first arm part 82, and a third section where the flange parts 83*b*, 83*c* are formed in the second arm part 83. That is, the flange cutout parts K12, K13 are bending rigidity reduced sections G having bending rigidity lower than those of the first, second, and third sections.

The front connection bar 9 is insertable in the through hole 81*a*1, and the inner diameter Dd is formed to be substantially equal to an outer diameter De (FIG. 8) of the front connection bar 9.

Next, the support cup 10 as a support member is described in detail.

As illustrated in FIGS. 6 and 7, the support cup 10 includes a base part 10*a*, a hole peripheral wall part 10*c*, and an outer peripheral wall part 10*b*.

The base part 10*a* has a substantial disk shape having a part thereof missing and having a center hole 10*a*1 as a second hole part. Specifically, the base part 10*a* is a metal member having a cutout part 10*d* having a predetermined angular range missing and connecting the outer periphery and the center hole 10*a*1, and having a substantial C-shape in a plan view.

The hole peripheral wall part 10*c* is a tubular part formed at the edge of the center hole 10*a*1 to extend in a direction of an axis CL10. The inner surface of the hole peripheral wall part 10*c* forms an inner peripheral surface 10*c*1 of the center hole 10*a*1.

The outer peripheral wall part 10*b* is formed at the periphery of the base part 10*a* in the same direction as the hole peripheral wall part 10*c* to extend higher than the hole peripheral wall part 10*c*.

The outer peripheral wall part 10*b* includes a cutting part 10*b*1 in a predetermined angle range of a part opposite to the cutout part 10*d* across the center, the cutting part 10*b*1 having a height lower than that of the hole peripheral wall part 10*c*. The predetermined angle range is, for example, 60 deg.

The base part 10*a* has a through hole 10*e* at the part opposite to the cutout 10*d* across the center.

Since the cutout part 10*d*, the cutting part 10*b*1, and the through hole 10*e* are provided, the mass of the support cup 10 is reduced. Moreover, an assembler can easily grasp a direction about the axis of the support cup 10, thereby preventing erroneous mounting of the support cup 10 to the front link 8 in a wrong direction.

The support cup 10 has an outer diameter Da (see FIG. 6) set equal to or slightly smaller than an inner diameter Db (see FIG. 3) of the flange parts 81*b*, 81*c* of the base part 81 of the front link 8.

The support cup 10 has an inner diameter Dc (see FIG. 6) of the center hole 10*a*1 substantially the same as the inner diameter Dd (see FIG. 3) of the through hole 81*a*1 of the front link 8. The front connection bar 9 is insertable in the center hole 10*a*1, and the inner diameter Dd is formed to be substantially equal to the outer diameter De (see FIG. 8) of the front connection bar 9.

As illustrated in FIGS. 8 and 9, the support cup 10 is combined with the front link 8 so that the outer peripheral wall part 10*b* fits inside the flange parts 81*b*, 81*c* in a direction where the base part 10*a* is far from the front link 8. With the support cup 10 combined with the front link 8, the axis CL10 of the center hole 10*a*1 and the axis CL8 (see FIG. 5) of the through hole 81*a*1 become substantially coincident with each other.

Thus, the front connection bar 9 is insertable in both the center hole 10*a*1 and the through hole 81*a*1.

As illustrated in FIGS. 2, 8, and 9, in the connection bar mounting structure KB, the outer peripheral wall part 10*b* of the support cup 10 and the flange parts 81*b*, 81*c* of the front link 8 are welded to form weld beads M1, M2, respectively.

A peripheral part of the hole peripheral wall part 10*c* of the support cup 10 on a side of the hole peripheral wall part 10*c* far from the front link 8 and the outer peripheral surface of the front connection bar 9 are welded to form a weld bead M3.

In the connection bar mounting structure KB, as illustrated in FIG. 8, the protruding part 81*a* of the front link 8 and the outer peripheral surface of the front connection bar 9 protruding from the through hole 81*a*1 are welded to form weld beads M4, M5 at a first portion in a direction orthogonal to the direction in which the first arm part 82 and the second arm part 83 are formed to extend.

As illustrated in FIGS. 8 and 9, in the connection bar mounting structure KB, the base part 81 of the front link 8 and the support cup 10 are integrated by engagement and welding of the flange parts 81*b*, 81*c* and the outer peripheral wall part 10*b* to form a link body T8.

This remarkably improves the bending rigidity of the link body T8 itself in comparison with the bending rigidity of the base part 81 of the front link 8 alone.

In the connection bar mounting structure KB, the front connection bar 9 is welded to the front link 8 and the support cup 10 and thus supported by the link body T8.

An axial range in which the front link 8 is supported is a range obtained by combining the thickness of the through hole 81*a*1 of the front link 8 and the axial length of the inner peripheral surface 10*c*1 of the hole peripheral wall part 10*c* of the support cup 10.

As a result, the connection bar mounting structure KB has high rigidity with respect to a force applied by the front connection bar 9 to the link body T8 in the direction of the axis CL9 (see FIG. 8) and a force applied by the front connection bar 9 to the link body T8 in the direction orthogonal to the axis CL9.

The connection bar mounting structure KB also has high rigidity with respect to a bending moment and a torsional moment applied to the front connection bar 9.

In the connection bar mounting structure KB, the weld bead M1 and the weld bead M2 are formed in a third portion which includes two areas opposed to each other in, a first diametric direction. The angular position of the circumferential center of the weld bead M1 is different from the angular position of the circumferential center of the weld bead M2 by 180 deg. The weld bead M3 is formed in a second portion such that the circumferential center of the weld bead M3 is at a second angular position different from those of the weld beads M1 and M2.

The second radial position in the second portion is set off from the first diameter direction in the third portion by, for example, 90 deg.

Thus, the connection bar mounting structure KB has high rigidity with respect to the bending moment in any direction, regardless of the direction.

In the connection bar mounting structure KB, the front connection bar 9 is integrated with the support cup 10 by welding. In the support cup 10, the outer peripheral wall part 10*b* having an outer diameter sufficiently larger than that of the front connection bar 9 is integrated with the flange parts 81*b*, 81*c* of the front link 8 by welding. Thus, the connection bar mounting structure KB has high torsional rigidity.

In contrast, the front link 8 has the flange cutout parts K12, K13. As described above, the flange cutout parts K12, K13 have bending rigidity lower than those of the first, second, and third sections.

Figure 10:
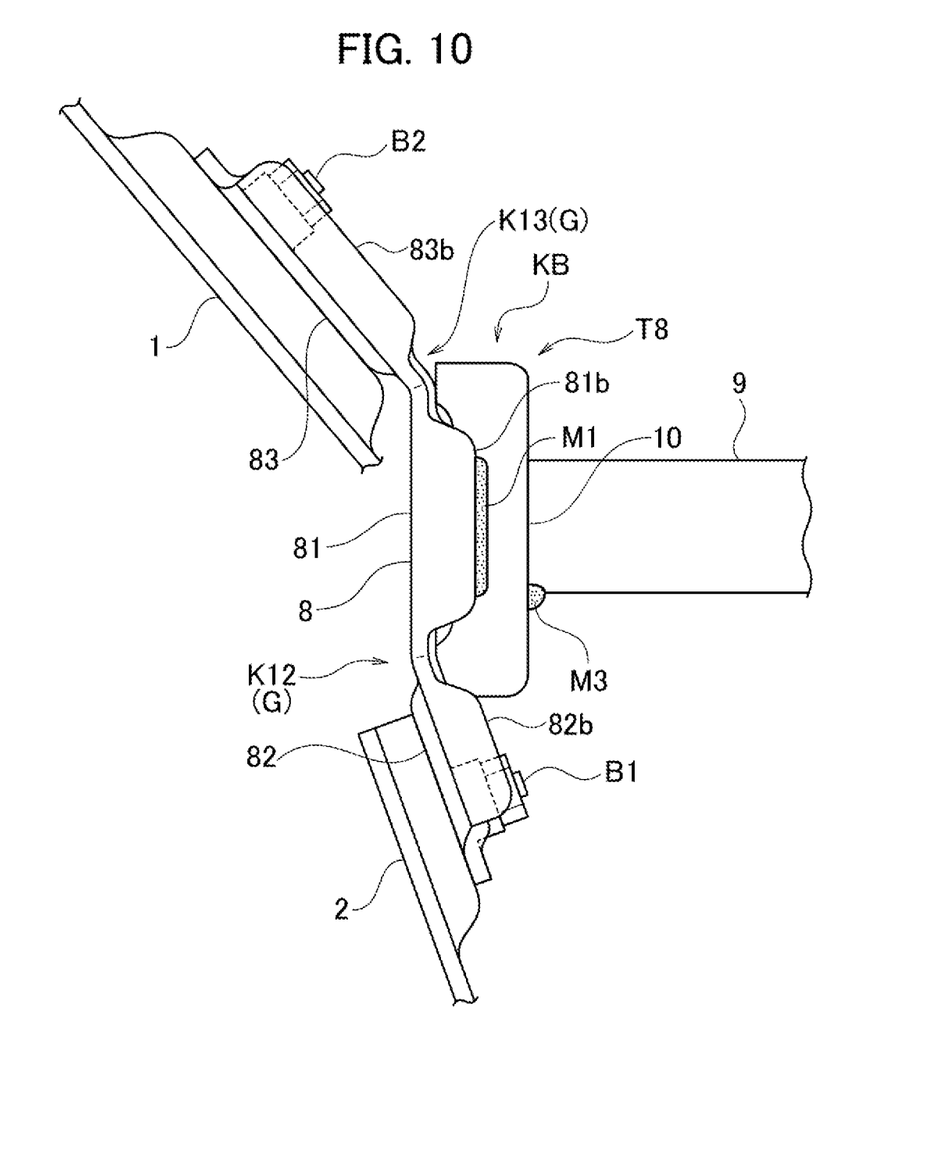
FIG. 10 is a model diagram illustrating deformation of the connection bar mounting structure KB.

Thus, when an impact force is applied from the outside to the connection bar mounting structure KB to generate a large bending moment or a large torsional moment, the flange cutout parts K12, K13 are preferentially deformed to absorb energy as illustrated in FIG. 10. Thus, the fracture where the front connection bar 9 separates from the link body T8 hardly occurs.

That is, when a vehicle mounted with the seat 91 including the connection bar mounting structure KB makes an oblique collision or offset collision, and a large bending moment or a large torsional moment is given to the connection bar mounting structure KB, the fracture where the front connection bar 9 separates from the connection bar mounting structure KB hardly occur.

Since the cutout part 10*d* is formed in the support cup 10, the insertion state of the front connection bar 9 in the link body T8 is visible from the outside. As a result, it is possible to visually recognize whether there is a problem with the fixation of the front connection bar 9 in a state after the collision of the vehicle as well as in a normal state of the vehicle.

As described in detail above, in the connection bar mounting structure KB, the front connection bar 9 hardly separates from the front link 8.

The present disclosure is not limited to the embodiments described above and can be variously modified without departing from the gist of the present disclosure.

Although the connection bar mounting structure KB has been described as a mounting structure of the front connection bar 9 at the front part of the seat 91, the connection bar mounting structure KB may be applied to a mounting structure of the rear connection bar 6 to the rear link 5.

The vehicle mounted with the seat 91 is not limited to an automobile and includes a variety of vehicles, such as an aircraft, a ship, and a railway vehicle.

The invention claimed is:

1. A connection bar mounting structure, comprising:
   a pair of link members, each link member including a first hole part in a middle part;
   a pair of vehicle members, each vehicle member configured to rotatably support each of the pair of link members at a first fixation part on a first end of each of the link members;
   a pair of side frames, each side frame configured to rotatably support each of the pair of link members at a second fixation part on a second end of each of the link members opposite to the first fixation part on the first end across the first hole part; and
   a connection bar, each end of the connection bar fixed to the first hole part of each of the pair of link members, wherein
   each of the pair of link members includes a first bending rigidity reduced section between the middle part and the first fixation part and a second bending rigidity reduced section between the middle part and the second fixation part, the first and second bending rigidity reduced sections having bending rigidity smaller than those of the middle part, the first fixation part, and the second fixation part,
   the connection bar mounting structure further comprises:
   a pair of support members, each support member including a second hole part coaxial with the first hole part of each of the pair of link members, each support member configured to be attached to the middle part to form a link body together with each of the pair of link members,
   the connection bar is insertable in and fixable to both the first hole part and the second hole part in the link body, and
   each of the pair of support members includes a hole peripheral wall part in which an edge part of the second hole extends in a cylindrical shape, and the connection bar is fixed by welding to each of the pair of link members at a first portion on a peripheral part of the first hole part of each of the pair of link members and to each of the pair of support members at a second portion on an edge part of the hole peripheral wall part on a side remote from the first hole part.

2. The connection bar mounting structure according to claim 1, wherein each of the pair of support members and each of the pair of link members are welded at a third portion that extends in a predetermined angular range about an axis of the connection bar, and an angular position about the axis of a circumferential center of the second portion is different from an angular position about the axis of a circumferential center of the third portion.

3. A vehicle seat, comprising:
   a seat cushion frame attachable to a floor of a vehicle, the seat cushion frame configured to be raised and lowered relative to the floor, wherein
   the seat cushion frame comprises:
   a pair of side frames spaced apart in a width direction of the vehicle seat;
   a pair of link members, each link member including a first hole part in a middle part, each link member including a first fixation part on a first end, the first fixation part rotatably supported by each of the pair of side frames, and a second fixation part on a second end opposite to the first fixation part across the first hole part, the second fixation part rotatably supported by a vehicle member; and
   a connection bar, each end of the connection bar fixed to the first hole part of each of the pair of link members, wherein
   each of the pair of link members includes a first bending rigidity reduced section between the middle part and the first fixation part and a second bending rigidity reduced section between the middle part and the second fixation part, the first and second bending rigidity reduced sections having bending rigidity smaller than those of the middle part, the first fixation part, and the second fixation part.

4. A connection bar mounting structure, comprising:
   a pair of link members, each link member including a first hole part in a middle part;
   a pair of vehicle members, each vehicle member configured to rotatably support each of the pair of link members at a first fixation part on a first end of each of the link members;
   a pair of side frames, each side frame configured to rotatably support each of the pair of link members at a second fixation part on a second end of each of the link members opposite to the first fixation part on the first end across the first hole part; and
   a connection bar, each end of the connection bar fixed to the first hole part of each of the pair of link members, wherein
   each of the pair of link members includes a first bending rigidity reduced section between the middle part and the first fixation part and a second bending rigidity reduced section between the middle part and the second fixation part, the first and second bending rigidity reduced sections having bending rigidity smaller than those of the middle part, the first fixation part, and the second fixation part, each of the pair of link members includes flanges bent at edges of the middle part, the first fixation part, and the second fixation part, the first bending rigidity reduced section is a cutout having substantially no bent part between the flange of the middle part and the flange of the first fixation part, and the second bending rigidity reduced section is a cutout having substantially no bent part between the flange of the middle part and the flange of the second fixation part.

5. The vehicle seat according to claim 3, wherein each of the pair of link members includes flanges bent at edges of the middle part, the first fixation part, and the second fixation part, the first bending rigidity reduced section is a cutout having substantially no bent part between the flange of the middle part and the flange of the first fixation part, and the second bending rigidity reduced section is a cutout having substantially no bent part between the flange of the middle part and the flange of the second fixation part.

\* \* \* \* \*